(12) United States Patent
Thorson et al.

(10) Patent No.: US 6,168,163 B1
(45) Date of Patent: Jan. 2, 2001

(54) SHAFT SEAL FOR MIXERS

(75) Inventors: John L. Thorson, Wauwatosa; Robert L. Komassa, Menomonee Falls, both of WI (US)

(73) Assignee: Mixer Systems, Inc., Pewaukee, WI (US)

( * ) Notice: Under 35 U.S.C. 154(b), the term of this patent shall be extended for 0 days.

(21) Appl. No.: 09/195,007

(22) Filed: Nov. 18, 1998

(51) Int. Cl.[7] .................................................. F16J 15/447
(52) U.S. Cl. .......................... 277/419; 277/418; 277/420; 277/421; 277/348
(58) Field of Search .................................... 277/348, 418, 277/419, 420, 421; 366/331, 45, 46, 47

(56) References Cited

U.S. PATENT DOCUMENTS

| | | |
|---|---|---|
| 2,646,999 | 7/1953 | Barske . |
| 3,279,804 * | 10/1966 | Blair ........................................ 277/92 |
| 3,305,241 | 2/1967 | Hart . |
| 3,921,962 * | 11/1975 | Feger et al. ....................... 259/178 R |
| 4,277,072 | 7/1981 | Forch . |
| 4,436,315 * | 3/1984 | Hatch ...................................... 277/92 |
| 4,460,276 | 7/1984 | Arribau et al. . |
| 4,482,194 * | 11/1984 | Chambers, Sr. ...................... 384/480 |
| 4,706,968 * | 11/1987 | Orlowski ................................ 277/53 |
| 4,936,197 | 6/1990 | Brent . |
| 4,989,883 | 2/1991 | Orlowski . |
| 5,069,461 | 12/1991 | Orlowski . |
| 5,174,583 * | 12/1992 | Orlowski et al. ...................... 277/56 |
| 5,277,489 * | 1/1994 | Hamm ................................. 366/331 |
| 5,378,000 | 1/1995 | Orlowski . |
| 5,498,006 * | 3/1996 | Orlowski ................................ 277/53 |
| 5,636,849 | 6/1997 | Jonsson et al. . |
| 5,655,780 | 8/1997 | Gambrill et al. . |
| 5,967,524 * | 10/1999 | Fedorovich .......................... 277/351 |

\* cited by examiner

*Primary Examiner*—Anthony Knight
*Assistant Examiner*—Vishal Patel
(74) *Attorney, Agent, or Firm*—Andrus, Sceales, Starke & Sawall, LLP

(57) ABSTRACT

A shaft seal is interposed between a tank and a rotating shaft extending through the tank and having a non-rotatable stator fixed to the tank and a rotor fixed for rotation to the shaft. A multiple labyrinth structure is formed between the rotor and the stator for preventing the ingress of contaminants from the tank and the egress of lubricant from the shaft. A self-aligning arrangement is constructed and arranged to permit the stator to shift axially along the shaft and compensate for various forces inflicted on the shaft as the shaft rotates.

20 Claims, 4 Drawing Sheets

SHAFT SEAL FOR MIXERS

FIELD OF THE INVENTION

The present invention relates broadly to shaft sealing structure and, more particularly, pertains to a sealing and feed through arrangement for a rotating shaft used in mixing equipment to prevent the ingress of contaminants and control the egress of lubricant regardless of the various forces subjected upon the shaft.

BACKGROUND AND SUMMARY OF THE INVENTION

Spiral blade horizontal drum mixers are used to provide highly viscous, wet mixtures of concrete, mortar and the like. Such horizontal drum mixers are commonly equipped with a low speed rotating shaft which extends across a mixing tank, and protrudes or feeds through the opposed end walls of the tank with one end of the shaft coupled to a drive arrangement and the other end of the shaft supported by a bearing structure. As is well known, sealing arrangements surrounding the shaft are positioned on the interior and exterior surfaces of each end wall. More particularly, a rotor is connected for rotation with the shaft and is mounted adjacent to a liner on each end wall, while a non-rotatable stator is fixed on the outside of each end wall. The rotor and stator cooperate to form a primary labyrinth seal into which grease is periodically delivered in a manner which will keep the shaft lubricated and, at the same time, trap contaminants so that they are restricted from entering the seal. In most cases, the labyrinth seal is formed by a single flange-like baffle extending into a formed recess to create a tortuous path that makes it difficult for contaminants to invade the seal to degrade lubricant effectiveness.

In the course of normal operation of the horizontal drum mixture, it has been found that the rotating shaft is subject to radial, axial and angular forces which can cause the labyrinth seals to bind and fail. One way to avoid this problem is to provide larger, more tolerable clearances between the baffle and its recess. However, such alternative is not desirable because it results in higher costs of machining the rotor and stator. Even if it were cost permissible, the larger labyrinth pathways would allow grease to flow more quickly into and out of the seal, such that the lubricating and trapping functions of the seal would be negatively affected.

A further problem with prior art seals is the exposure of the inner portions of the seal within the mixing tank to the setting or "freezing" of grout infiltrate during periods of mixer shut down at the interface between each rotor and end wall liner. Before mixing can resume, this problem must be rectified by breaking the newly formed grout seal such as by applying a grinding wheel thereto. Such remedy creates unwanted down time of the mixer and results in increased maintenance costs.

It should also be noted that the formation of shaft seals of the type described above involves machining methods that can create a troublesome gap between the rotor and stator which makes alignment between these components less than precise, so that the integrity of the seal is compromised.

Despite the existence of various shaft sealing devices, there remains a need for an enhanced sealing arrangement which will provide effective sealing action, whether the shaft is at rest or in rotation. Accordingly, it is desirable to provide a shaft seal which will effectively retain lubricant and prevent contamination therein. It is also desirable to provide a shaft seal in which a rotor and stator are manufactured and assembled in a more precise fashion. Likewise, it is desirable to provide a shaft seal which is unaffected by various forces applied to the shaft during the rotation thereof. Furthermore, it is desirable to provide a sealing device which will enable the holding of tighter tolerances in the formation of labyrinth seals. It is also desirable to provide a shaft seal which will improve the effectiveness of a horizontal drum mixing machine.

It is a general object of the present invention to provide an improved primary seal and feed through arrangement for mixing equipment having a mixing tank through which a rotatable shaft extends, such that a portion of the seal arrangement floats and self aligns to compensate for radial, axial, and angular misalignment between the rotating shaft and the seal arrangement.

It is also an object of the present invention to provide a double labyrinth type shaft seal which allows for the use of tighter tolerances along the labyrinth pathways minimizing wear and improving the sealing capabilities for a rotating shaft.

It is a further object of the present invention to provide a secondary face seal arrangement interposed between a seal rotor and a seal stator mounted along a low speed rotating shaft on a horizontal drum mixer.

Yet another object of the present invention is to provide a shaft seal of split construction which is easily manufactured, assembled and serviced.

Still another object of the present invention is to provide a shaft seal for a spiral blade mixer which is effective to control the setting of wet mixed material during periods of mixer shutdown.

Moreover, a further object of the present invention is to provide a shaft seal which employs a compressible gasket to facilitate set-up of labyrinth structure.

In accordance with one aspect of the present invention, a shaft seal is interposed between a tank and a rotating shaft extending through the tank, and has a non-rotatable stator fixed to the tank and a rotor fixed for rotation to the shaft. The seal is improved so as to include a multiple labyrinth structure formed between the rotor and the stator for preventing the ingress of contaminants from the tank and the egress of lubricant from the shaft. The invention is further improved by a self-aligning arrangement constructed and arranged to permit the stator to shift axially along the shaft and compensate for various forces inflicted on the shaft as the shaft rotates. In the preferred embodiment, the multiple labyrinth structure includes a pair of baffles oriented at substantially 90° to each other. The rotor is formed with an axially extending recess receiving one of the baffles and a radially extending groove receiving the other of the baffles. The tank includes an end wall and has a liner connected thereto. One of the baffles is defined by an axially extending flange formed on the stator, while the other of the baffles is formed by the liner. A compressible gasket is interposed between facing surfaces of the stator and rotor and is engaged against the end wall. A set of fastener assemblies extends through the tank liner, the tank end wall, the gasket and the stator for holding the rotor and stator together in a preload arrangement relative to the tank. A first rubber spring washer and ring are disposed for rotation between the rotor and the shaft, and a second rubber spring washer and a ring are fixedly disposed between the stator and the shaft. A stationary lip seal is also fixed between the stator and the shaft. The stator extends outwardly of the tank end wall and the rotor extends inwardly of the tank liner. A bearing device is supported on an end of the shaft outwardly of the stator. The tank liner is spaced from the walls forming the rotor groove. The self-aligning arrangement is defined by the spacing of the tank liner from the walls of the groove, the preload arrangement of the fastener assemblies and the compressibility of the gasket.

In another aspect of the invention, a seal is provided for use with a mixing tank provided with a rotating shaft extending across and protruding through opposed end walls, each end wall having an inner liner. The seal includes a stator fixed to one of the end walls and having a facing surface and an axially extending flange formed thereon. A rotor is connected to the shaft for rotation therewith, and has a facing surface as well as an axially extending recess for receiving the stator flange to define a first labyrinth passage. The rotor also has a groove extending radially inwardly from the periphery of the rotor for receiving the liner of the end wall to define a second labyrinth passage in communication with the first labyrinth passage for controlling the flow of lubricant between the shaft and the rotor. A compressible member is interposed between the facing surfaces of the stator and the rotor and is engaged with the end wall. The liner is spaced from the walls forming the groove and cooperates with the compressible member to enable the stator to float axially on the shaft and compensate for various forces inflicted upon the shaft as the shaft is rotating, while continuing to control the flow of lubricant between the shaft and the rotor. A mechanical face seal assembly is located between the stator and the rotor and includes a pair of facing steel rings, one of the rings being disposed for rotation in the rotor and the other of the rings being fixed in the stator. The mechanical face seal further includes a first rubber spring washer associated with one of the rings, and a second rubber spring washer associated with the other of the rings.

The invention also contemplates a method of constructing a seal for use with a rotating shaft extending across and protruding through a mixing tank having a hole formed in an end wall and a liner extending adjacent thereto. The method comprises the steps of sliding a rotor having a facing surface, a recess extending axially from the facing surface, and a groove extending radially inwardly from a periphery of the rotor through the end wall and onto the shaft, such that the liner projects into the groove in spaced relationship therewith; positioning the liner a predetermined distance from the walls forming the groove and clamping the rotor to the shaft; installing a compressible member against the facing surface of the rotor such that an outer periphery of the compressible member lies against the end wall of the tank; passing threaded fasteners through the liner, end wall and the compressible member, and then attaching primary nuts to the threaded fasteners so that the nuts engage the end wall; sliding a stator having a facing surface and an axially extending flange over the shaft and threaded fasteners, and against the compressible member and nuts, such that the flange extends into the rotor recess in spaced relationship therewith; and threading secondary nuts onto the threaded fasteners to non-rotatably fix the stator relative to the shaft and to preload the threaded fasteners such that the stator shifts axially upon the rotating shaft when various forces are imposed thereon. The step of sliding a rotor on the shaft includes a step of providing the rotor with a mechanical face seal. The step of sliding a stator on the shaft includes the step of providing the stator with a lip seal engageable with the shaft. The step of sliding the rotor onto the shaft includes a step of providing nesting halves of the rotor. The step of sliding the stator on the shaft includes the step of providing mating halves of the stator. The method includes the step of supporting an end of the shaft in a bearing structure. The step of positioning the liner a predetermined distance from the walls forming the rotor groove includes the step of spacing an inside wall of the liner in the range of 0.003 to 0.005 inches from an innermost wall of the groove.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
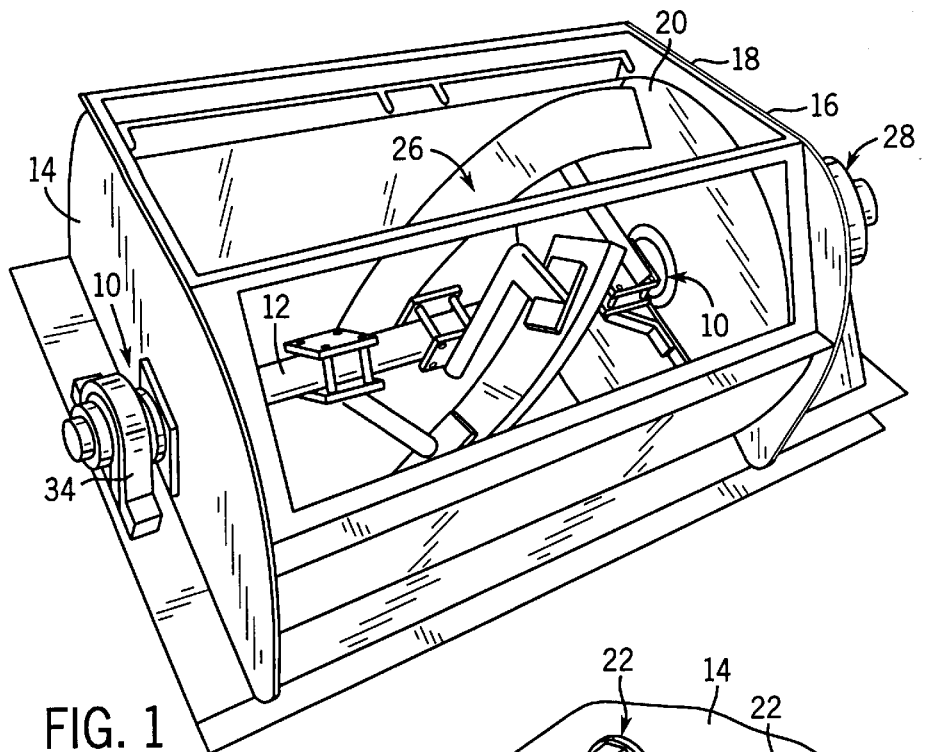
FIG. 1 is a cut-away, isometric view of a spiral blade mixer embodying the shaft seal of the present invention.
Figure 3:
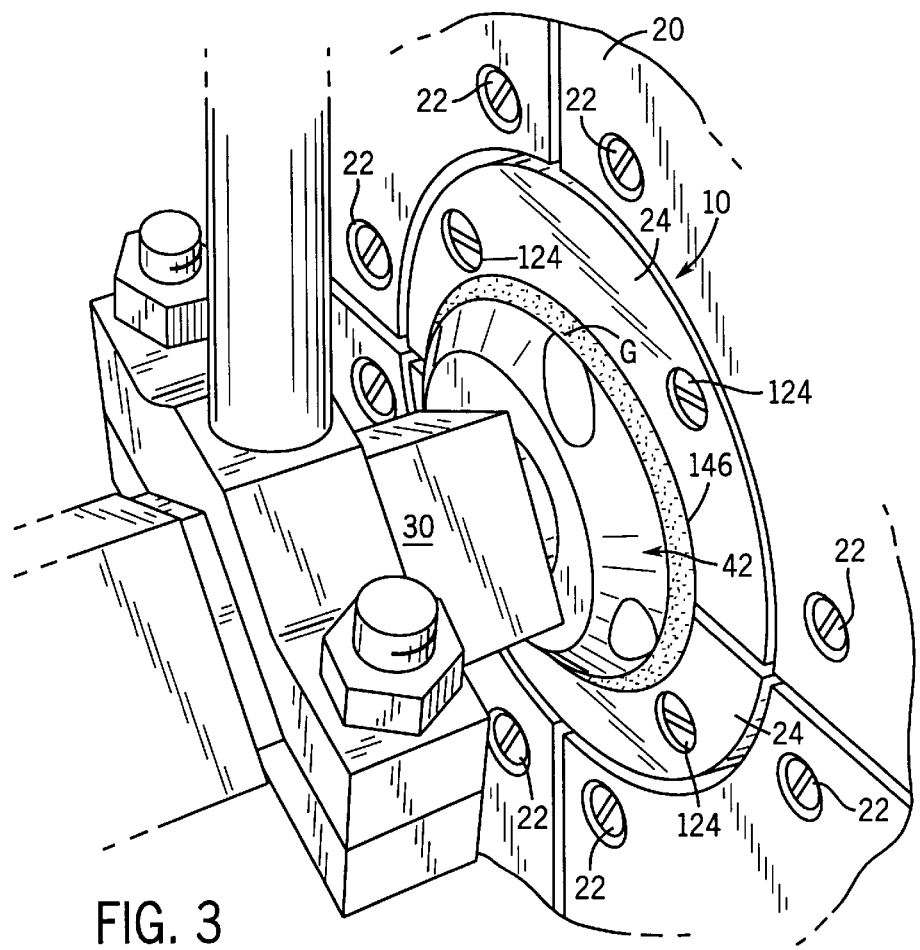
FIG. 3 is an enlarged, partial isometric view of another portion of the shaft seal as seen from the interior of the spiral blade mixer shown in FIG. 1.

Referring now to the drawings, FIG. 1 discloses interior and exterior views of a seal arrangement 10 embodying the present invention as it appears when installed on opposite ends of a rotating shaft 12 extending across and protruding through suitable openings formed in opposed end walls 14, 16 of a typical horizontal drum mixer tank 18. Each of the end walls 14, 16 has a multi-piece liner 20 bolted thereto by suitable fastener assemblies 22. The liner 20 includes a pair of generally semi-circular liner plates 24 (FIG. 3) which surround the shaft 12 on the inside of mixer tank 18. In the preferred embodiment, the shaft 12 is provided with a spiral blade or paddle configuration 26 and is coupled to a drive mechanism 28 for rotating the shaft 12 at relatively low speed (e.g. 20 rpm), and effectively mixing dry and wet mixtures of concrete, mortar and other grout-like products in the tank 18. The shaft 12 is preferably provided with a wear plate assembly 30 (FIG. 3) which serves as a support structure for the spiral blade configuration 26. The exterior surface of end wall 14 is equipped with a lubrication system (not shown) having hoses 32 for periodically delivering grease or other lubricants to the seal arrangement 10. The grease is transported in a manner which will lubricate the seal arrangement 10 and the shaft 12, and simultaneously prevent contaminants in the interior of mixing tank 18 from entering the seal arrangement 10 as will be appreciated hereafter.

Figure 2:
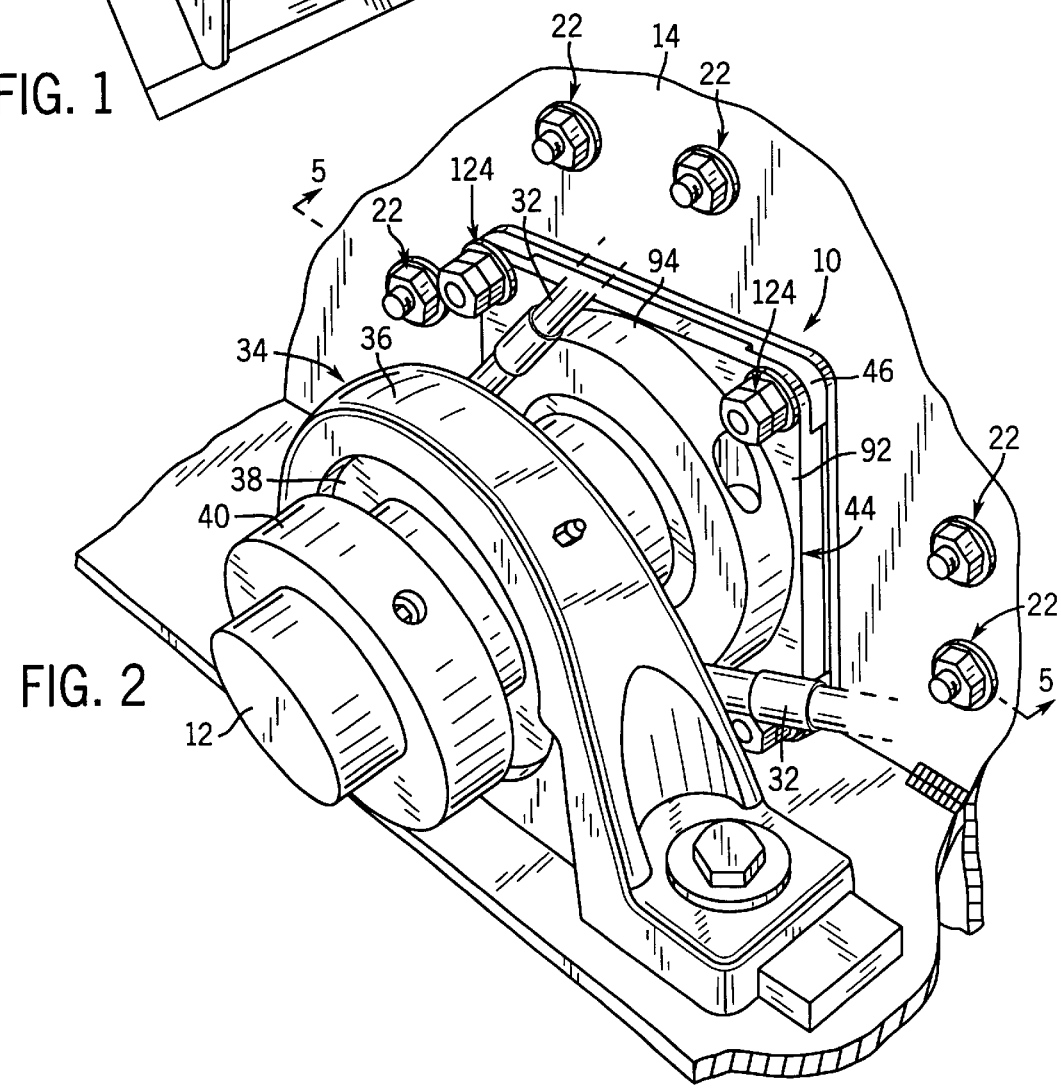
FIG. 2 is an enlarged, partial isometric view of one portion of the shaft seal as seen from the exterior of the spiral blade mixer shown in FIG. 1.

As seen in FIG. 2, the end of shaft 12 protruding beyond end wall 14 is supported in a bearing structure 34 having an outer race 36 and an inner race 38 normally locked on shaft 12 by a cylindrical collar 40. Another bearing structure (not shown) is provided on the other end of shaft 12 between end wall 16 and drive mechanism 28.

Figure 4:
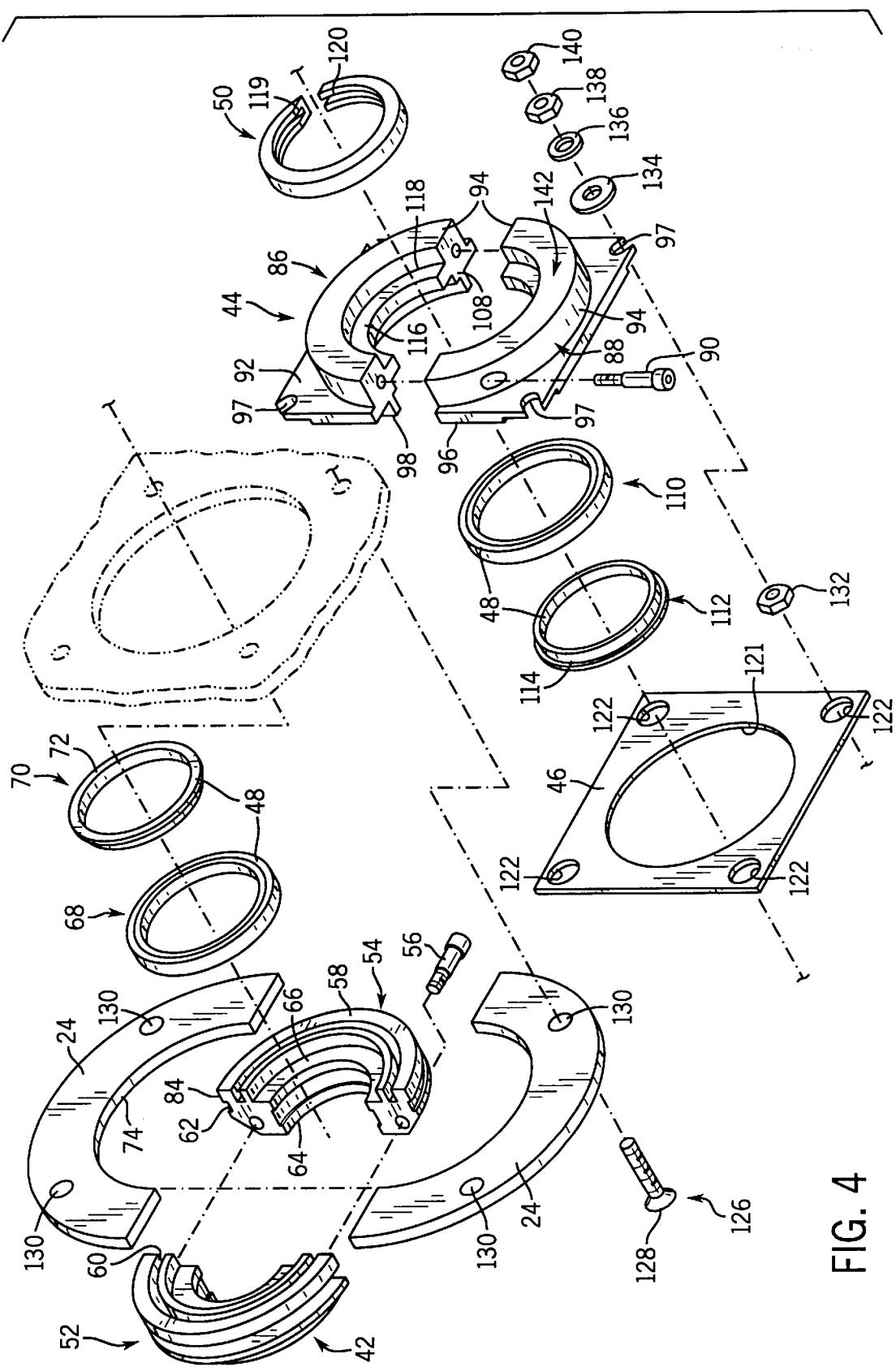
FIG. 4 is an exploded view of the shaft seal.

Turning now to the exploded view in FIG. 4, the sealing arrangement, according to the present invention, is comprised of an annular, metallic rotor 42, a stepped, metallic stator 44, a compressible rubber gasket 46, a mechanical face seal assembly 48 and a split elastomeric lip seal 50, all of which are positioned about the shaft 12 relative to each of the end walls 14, 16 and the liner plates 24 of the particular end wall.

The metallic rotor 42 includes a pair of mating halves 52, 54 which are joined together in clamping relationship on the shaft for rotation therewith by a pair of shoulder bolts received in suitably threaded apertures formed in the halves 52, 54. Only one shoulder bolt 56 is seen in FIG. 4. The rotor 42 also has a facing surface 58, a recess 60 extending axially from the facing surface 58, and a groove 62 extending radially inwardly from the outer periphery of the rotor 42. The inner periphery of the rotor 42 is provided with a first shallow, annular relief channel 64 projecting radially outwardly therefrom, and a first radially outwardly extending annular notch 66 which accommodates a first annular rubber spring washer 68. A first annular, hardened steel ring 70 having an L-shaped cross section fits into the washer 68 and forms a seal face 72. The washer 68 and ring 70 together rotate in the rotor 42 and define one half of the mechanical face seal assembly 48, the other half being located in the stator 44 to be described below.

Figure 6:
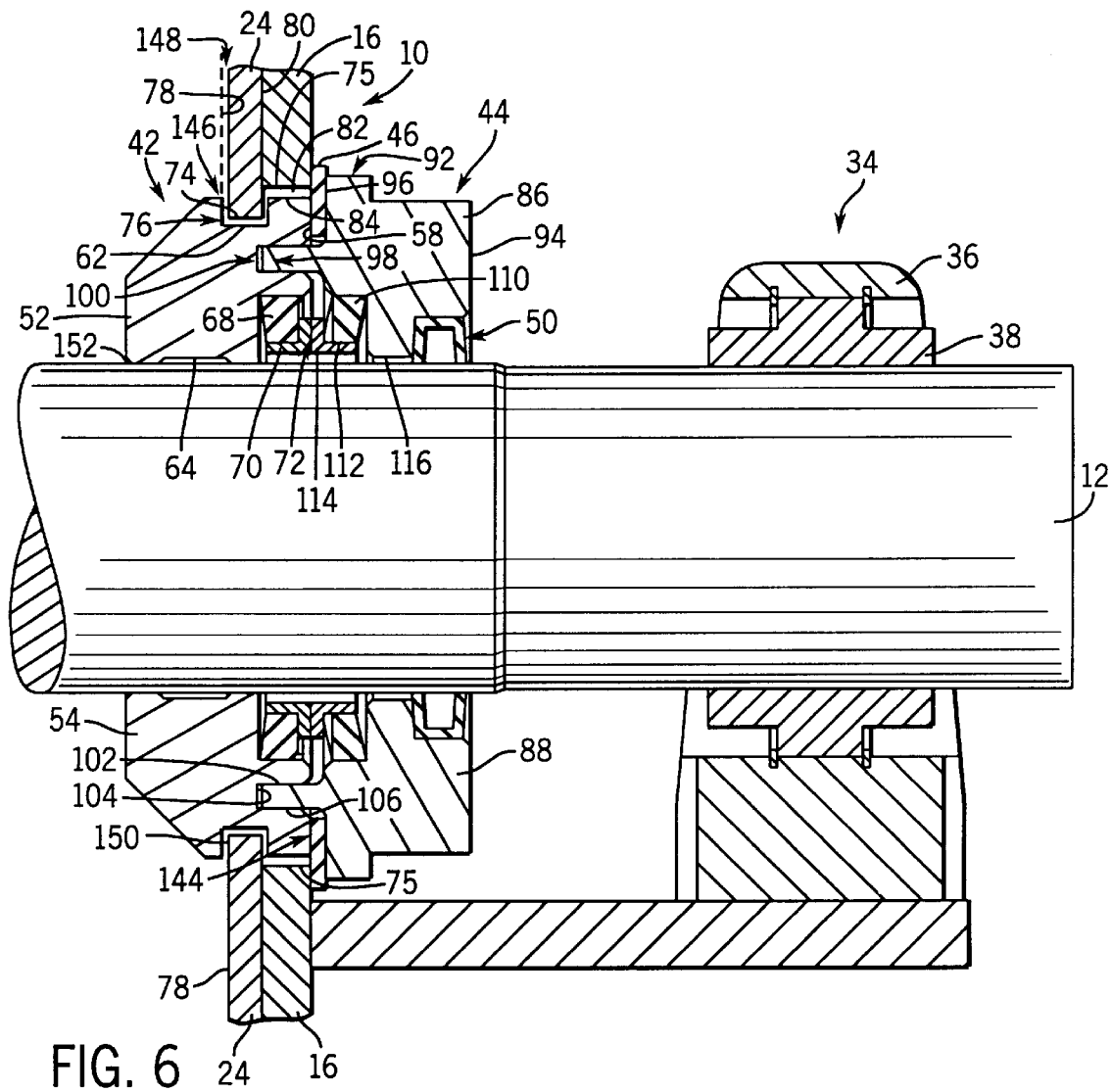
FIG. 6 is a fragmentary, cross-sectional view of the shaft seal taken on line 6—6 of FIG. 5.

As shown in FIG. 6, the rotor 42 is adapted to project through the end wall hole defined by the radially innermost edge 74 of liner plates 24, and the radially innermost edge 75 of adjacently disposed end wall 14, 16, which is offset radially and outwardly from liner plate edge 74. The liner plate edge 74 serves as a first baffle which extends into the rotor groove 62 such that a first labyrinth passage 76 is defined between the walls of the groove 62, and an inside wall 78 of liner plates 24, the liner plate edge 74 and an outer wall 80 of liner plate 24. The first labyrinth passage 76 is connected with an axially extending passage 82 formed by the wall 80, the edge 75 and an axially extending segment 84 of rotor outer periphery.

The metallic stator 44, like the rotor 42, includes a pair of mating halves 86, 88 which are joined together around shaft 12 by a pair of shoulder bolts 90 received in suitably threaded apertures in the halves 86, 88. Stator 42 has a four-sided base plate portion 92, and an annular portion 94 stepped radially inwardly from the base plate portion 92. The base plate portion 92 has a facing surface 96 and four corners, each of which is formed with in inwardly extending U-shaped notch 97 (FIG. 4). A flange 98 projects axially from the facing surface 96 (FIG. 4) and serves as a second baffle adapted to be received in rotor recess 60 such that a second labyrinth passage 100 is defined between the walls of recess 60, and a radially outermost wall 102 of flange 98, an end 104 of flange 98 and a radially innermost wall 106 of flange 98.

The inner periphery of stator 44 is formed with a second radially extending annular notch 108 (FIG. 4) which receives a second annular rubber spring washer 110. A second annular hardened steel ring 112 having an L-shaped cross section is nested inside the washer 110, and forms a seal face 114 engageable with seal face 72. Washer 110 and ring 112 define the other half of mechanical face seal assembly 48. The inner periphery of stator 44 is also provided with a second shallow, annular relief channel 116 and a third radially outwardly extending notch 118 which maintains the lip seal 50 therein. As seen in FIG. 4, lip seal 50 preferably has a C-shaped split construction having free ends 119, 120.

The compressible gasket 46 is similar in shape to the stator base plate portion 92 and is formed with a large central opening 121 through which the shaft 12 and flange 98 pass. The gasket 46 has four corner portions, each of which is provided with a circular opening 122 to be aligned with a respective notch 97 in each corresponding corner of base plate portion 92. Gasket 46 is adapted to be interposed between rotor and stator facing surfaces 58 and 96 (FIGS. 4 and 6), respectively, such that the gasket outer edges are engageable against the exterior surface of end wall 14, 16 as shown in FIGS. 2 and 6.

Figure 5:
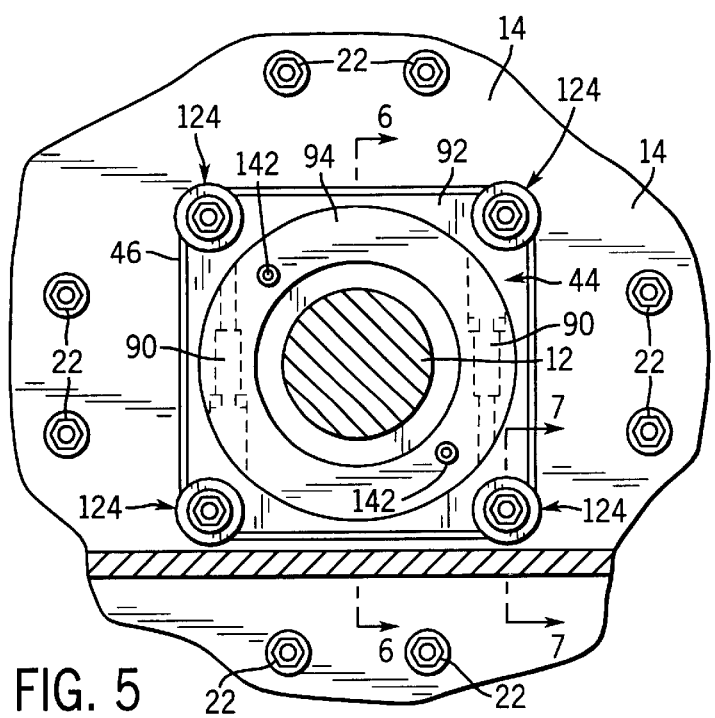
FIG. 5 is a fragmentary end view of the shaft seal as taken on line 5—5 of FIG. 2.
Figure 7:
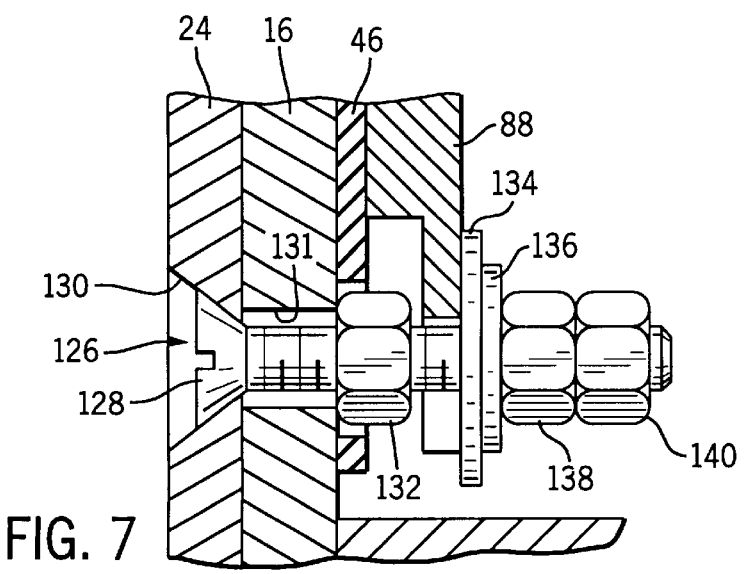
FIG. 7 is a fragmentary, cross-sectional view of the shaft seal taken on line 7—7 of FIG. 5.

With reference to FIGS. 2, 5 and 7, the stator 44 and gasket 46 are fixedly secured to the exterior surfaces of each end wall 14, 16 by a set of four fastener assemblies 124. Each of the fastener assemblies 124 includes a threaded screw 126 having a conical head 128 which is received in a corresponding recess 130 formed in liner plate 24. The shaft of threaded screw 126 passes through an enlarged opening 131 in each end wall 14, 16 and through one of the openings 122 formed in the corners of gasket 46. A first nut 132 is then threaded upon the screw 126 for engagement against the exterior surface of end wall 14,16. The threaded shaft 126 also passes through one of the notches 97 of stator base plate portion 92, first washer 134 and a second washer 136 smaller in diameter than washer 134. Second and third nuts 138 and 140, respectively, are threaded on the end of screw 126 in a manner to be further described, such that this fastener assembly 124 is preloaded to enable a floating behavior of the stator 44 as various forces are subjected to the shaft 12.

A pair of diametrically exposed threaded grease holes 142 are formed on the exterior face of stator 44 for transporting grease via hoses 32 into and around facing notches 66 and 108 so that the rings 70,112 of face seal assembly 48 and the shaft 12 are properly lubricated. The labyrinth passages 76 and 100, passage 82 and a passage 144 between rotor facing surface 58 and gasket 46 form a double labyrinth seal which retards the outgoing flow of grease G (FIG. 3) from the shaft 12 to an interface 146 inside tank 18 between rotor 42 and the inside wall 78 of liner plates 24. The grease purged through the sealing arrangement 10 also acts as a trap to prevent the ingress of contaminants from tank 18. It is noted that the baffles defined by the liner plate edges 74 and the flange 98 are preferably oriented at 90° relative to each other to create a particularly tortuous path for restricting the egress of lubricant and the ingress of contaminants.

Before assembly begins, all facing surfaces of the seal components should be adequately lubricated. To assemble the sealing component 10, the four components 68, 70,110, 112 of face seal assembly 48 are positioned over the end of the shaft 12 before the bearing structure 34 is installed. Mating rotor halves 52, 54 are loosely connected around shaft 12 between end wall 14 or 16 and bearing structure 34 using shoulder bolts 56. The loosely connected rotor halves 52, 54 are then slid through the hole in end wall 14 or 16 until the innermost surfaces of the halves 52, 54 contact the square assembly 30 surrounding the shaft 12. At this point, the liner plate edges 74 are loosely placed in the rotor groove 62, and the liner plates 24 are secured to end wall 14 or 16 using threaded screw 126 and nut 132 as detailed above. Then, using a straight edge (not shown), a predetermined gap 148 (FIG. 6), preferably in the range of 0.003 to 0.005 inches, is set between an innermost vertical wall 150 of groove 62 and the inside wall 78 of liner plates 24. Once gap 148 is set, shoulder bolts 56 are torqued to clamp rotor halves 52, 54 on shaft 12. It is important that gap 148 is equally set with respect to bolt halves 52, 54. First spring washer 68 and first ring 70 are installed in the formed rotor 42, such that the ring seal face 72 faces the bearing end of the shaft 12. Next, the compressible gasket 46 is installed over the threaded screws 126 and nuts 132 as also detailed above. The stator halves 86, 88 are then tightly connected together around shaft 12 by shoulder bolts 90 such that formed stator 44 is non-rotatable relative to shaft 12. Second spring washer 110 and second ring 112 are installed in the formed stator 44 such that seal face 72 matingly engages seal face 114. The formed stator 44 is then slid along shaft 12 so that the notches 97 pass over the threaded screws 126 and nuts 132, and the base plate portion 92 on stator 44 is moved against gasket 46 until flange 98 bottoms in recess 60 so that gasket 46 is compressed. Washers 134 and 136 are installed over each screw 126 and nut 138 is tightened to initially preload the fastener assembly 124. To attain the desired preload, the nut 138 is then backed off one half turn, which is specifically designed to correspond to the gap 148 set previously. The nut 138 of preloaded fastener assembly 124 thus functions as a simple micrometer which acts together with the compressibility of gasket 46 and the structure of groove 62 to create a self-aligning feature which allows the stator 44 to slide incrementally or "float" along shaft 12 to compensate for radial, axial and angular misalignment forces imposed upon shaft 12 during rotation thereof. Once nut 138 is set, the nut 140 is threaded on each screw 126 so as to "jam" or lock each nut 138 in place. The one-piece split lip seal 50 is then installed in the stator notch 118. The last assembly step involves attaching the lubrication hoses 32 with the grease holes 142 formed in stator 44.

With the seal arrangement 10 in place, grease is periodically delivered to the shaft 12 and the face seal assembly 48 and purged with the double labyrinth seal, slowing the exit of lubricant at interface 146 so as to prevent the entry of contaminants into the seal. A particularly salient feature of the invention is the capability of the purged grease at the interface 146 to prevent the setting of wet concrete-like mix and the resulting lockup of shaft 12 inside the tank 18 during mixer shut down.

In operation, the rotor 42, as well as spring washer 68 and ring 70, rotate together with the shaft 12, while the stator 44 and its spring washer 110 and ring 112 remain fixed to end wall 16 and non-rotatably mounted on shaft 12. Rings 70, 112 float on the spring washers 68,110, respectively, to allow them to align with each other. Lip seal 50 prevents grease from migrating out of stator 44. Because the rotor halves 52, 54 are tightly clamped to shaft 12 by shoulder bolts 56, no grease will escape from the interface 152 between the rotor 42 and the shaft 12 inside tank 18 nor will any contaminants enter this interface 152.

It should be appreciated that the present invention provides a shaft seal 10 in which a rotor 42 and a stator 44 are manufactured and assembled in a more precise manner. That is, shaft seal 10 of the present invention employs a split construction for the rotor 42 and stator 44 which enables a significant improvement in assembly and service in the field, and avoids the gap problems between previously machined stators and rotors. The arrangement described above sets forth a shaft seal 10 with a primary double labyrinth seal, in which tighter clearances may be maintained between the liner plates 24 and the groove 62, and between the flange 98 and the recess 60, thereby minimizing wear and increasing seal capability. The compressible gasket 46 is employed to facilitate set-up of the labyrinth structure in the seal array. "Floating" of the stator 44 in response to shaft forces is achieved with the enlarged groove 62, fastener assemblies 124 set to a slight preload, and the compressibility of gasket 46.

Various alternatives and embodiments are contemplated as being within the scope of the following claims particularly pointing out and distinctly claiming the subject matter regarded as the invention.

We claim:

1. In a shaft seal interposed between a tank and a rotary shaft extending through the tank, and having a non-rotatable stator fixed to the tank and a rotor fixed for rotation to the shaft, the improvement comprising:

a multiple labyrinth structure formed between the rotor and the stator for preventing the ingress of contaminants from the tank and the egress of lubricant to the shaft; and a self-aligning arrangement constructed and arranged to permit the stator to shift axially along the shaft and compensate for various forces inflicted on the shaft as the shaft rotates;

wherein the multiple labyrinth structure includes a pair of baffles oriented at substantially 90° to each other;

wherein the rotor is formed with an axially extending recess receiving one of the baffles, and a radially extending groove receiving the other of the baffles;

wherein the tank includes an end wall and a liner connected thereto; wherein the one of the baffles is defined by an axially extending flange formed on the stator; and wherein the other of the baffles is formed by the liner.

2. The improvement of claim 1, wherein a compressible gasket is interposed between facing surfaces of the stator and the rotor and is engaged against the tank end wall.

3. The improvement of claim 2, including a set of fastener assemblies extending through the tank liner, the tank end wall, the gasket and the stator for holding the rotor and stator together in a preload arrangement relative to the tank.

4. The improvement of claim 1, including a first rubber spring washer and a ring disposed for rotation between the rotor and the shaft, and a second rubber spring washer and a ring fixedly disposed between the stator and the shaft.

5. The improvement of claim 4, including a stationary lip seal fixed between the stator and the shaft.

6. The improvement of claim 1, wherein the stator extends outwardly of the tank end wall and the rotor extends inwardly of the tank liner.

7. The improvement of claim 1, including a bearing device supporting an end of the shaft outwardly of the stator.

8. The improvement of claim 3, wherein the tank liner is spaced from the walls forming the rotor groove.

9. The improvement of claim 8, wherein the self-aligning arrangement is defined by the spacing of the tank liner from the walls of the groove, the preload arrangement of the fastener assemblies and the compressibility of the gasket.

10. A seal for use with a mixing tank provided with a rotating shaft extending across and protruding through opposed end walls, each end wall having an inner liner, the seal comprising:

a stator fixed to one of the end walls, and having a facing surface and an axially extending flange formed thereon;

a rotor connected to the shaft for rotation therewith and having a facing surface, and an axially extending recess for receiving the stator flange to define a first labyrinth passage, the rotor also having a groove extending radially inwardly from the periphery of the rotor for receiving the liner of the end wall to define a second labyrinth passage in communication with the first labyrinth passage for controlling the flow of lubricant between the shaft and the rotor; and a compressible member interposed between the facing surfaces of the stator and the rotor, and engaged with the end wall, wherein the liner is spaced from the walls forming the groove and cooperates with the compressible member to enable the stator to float axially on the shaft and compensate for various forces inflicted upon the shaft as the shaft is rotating, while continuing to control the flow of lubricant between the shaft and the rotor.

11. The seal of claim 10, including a mechanical face seal assembly located between the stator and the rotor.

12. The seal of claim 11, wherein the mechanical face seal includes a pair of facing steel rings, one of the rings being disposed for rotation in the rotor and the other of the rings being fixed in the stator.

13. The seal of claim 12, wherein the mechanical face seal further includes a first rubber spring washer associated with one of the rings, and a second rubber spring washer associated with the other of the rings.

14. A method of constructing a seal for use on a rotating shaft extending across and protruding through a mixing tank having a hole formed in an end wall and a liner adjacent thereto, the method comprising the steps of:

sliding a rotor having a facing surface, a recess extending axially from the facing surface, and a groove extending radially inwardly from a periphery of the rotor through the end wall hole and onto the shaft, such that the liner projects into the groove in spaced relationship therewith;

positioning the liner a predetermined distance from the walls forming the groove and clamping the rotor to the shaft;

installing a compressible member against the facing surface of the rotor such that an outer periphery of the compressible member lies against the end wall of the tank;

passing threaded fasteners through the liner, end wall and the compressible member and then attaching primary nuts to the threaded fasteners so that the nuts engage the end wall;

sliding a stator having a facing surface and an axially extending flange over the shaft and threaded fasteners and against the compressible member and nuts, such that the flange extends into the rotor recess in spaced relationship therewith and the member is compressed; and threading secondary nuts onto the threaded fasteners to non-rotatably fix the stator relative to the shaft, and to preload the threaded fasteners such that the stator shifts axially upon the rotating shaft when various forces are imposed thereon.

15. The method of claim 14, wherein the step of sliding a rotor onto the shaft includes a step of providing the rotor with a mechanical face seal.

16. The method of claim 14, wherein the step of sliding a stator over the shaft includes a step of providing the stator with a lip seal engageable with the shaft.

17. The method of claim 14, wherein the step of sliding a rotor onto the shaft includes the step of providing mating halves of the rotor.

18. The method of claim 14, wherein the step of sliding the stator over the shaft includes the step of providing mating halves of the stator.

19. The method of claim 14, including the step of supporting an end of the shaft in a bearing structure.

20. The method of claim 14, wherein the step of positioning the liner a predetermined distance from the walls forming the rotor groove includes the step of spacing an inside wall of the liner in the range of 0.003 to 0.005 inches from an innermost wall of the groove.

* * * * *